United States Patent [19]
Takezoe et al.

[11] 4,388,716
[45] Jun. 14, 1983

[54] TWO-WAY TRANSMISSION SYSTEM

[75] Inventors: Fumihiko Takezoe; Minoru Koyama, both of Hino, Japan

[73] Assignee: Fuji Electric Co., Ltd., Kanagawa, Japan

[21] Appl. No.: 206,603

[22] Filed: Nov. 13, 1980

[30] Foreign Application Priority Data

Nov. 15, 1979 [JP] Japan ................. 54-147023
Feb. 22, 1980 [JP] Japan ................. 55-20486

[51] Int. Cl.³ .............................. H04L 5/14
[52] U.S. Cl. ..................... 370/29; 370/24; 370/77; 375/36
[58] Field of Search ............. 370/29, 24, 32, 85, 370/77; 375/36, 7; 307/17; 178/64

[56] References Cited

U.S. PATENT DOCUMENTS

| | | | |
|---|---|---|---|
| 3,721,763 | 3/1973 | Homan et al. | 370/29 |
| 3,758,719 | 9/1973 | Klose | 370/29 |
| 3,851,098 | 11/1974 | Pingault | 375/36 |
| 3,967,058 | 6/1976 | Moriya et al. | 370/29 |
| 3,974,339 | 8/1976 | Lutz et al. | 370/29 |
| 4,326,287 | 4/1982 | Abramson | 370/29 |

*Primary Examiner*—Douglas W. Olms
*Attorney, Agent, or Firm*—Sughrue, Mion, Zinn, Macpeak and Seas

[57] ABSTRACT

A two-way transmission system including a master station coupled to a transmitting end of a transmission line and a sub station coupled to the receiving end of the transmission line. A pulse transformer is provided between the transmission line and at least one of the master and sub stations. Variations in current flowing through the winding of the pulse transformer coupled to the transmission line produce variations in the impedance of the secondary winding which are detected with a comparator circuit to produce an output received signal. A diode may be inserted in series with the transmission line at at least one of the receiving and transmitting ends of the transmission line to prevent the charging of the distributed capacitance of the transmission line to increase the maximum possible transmission rate.

6 Claims, 22 Drawing Figures

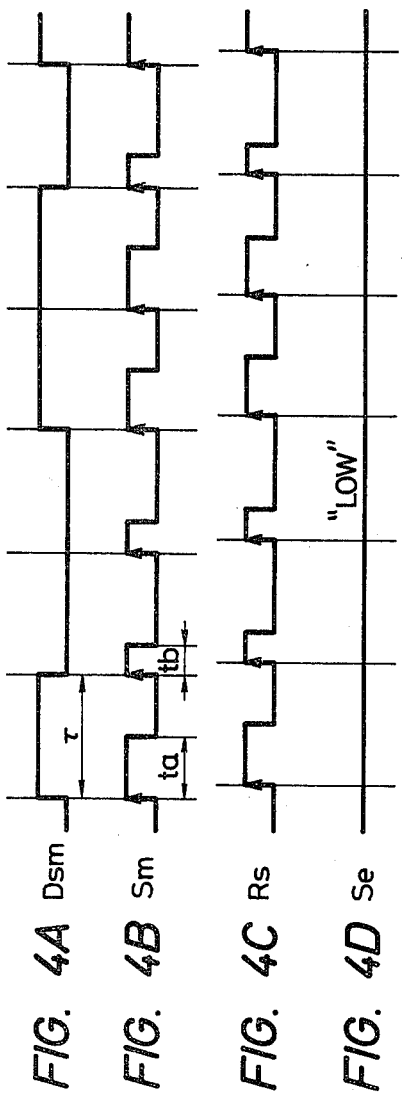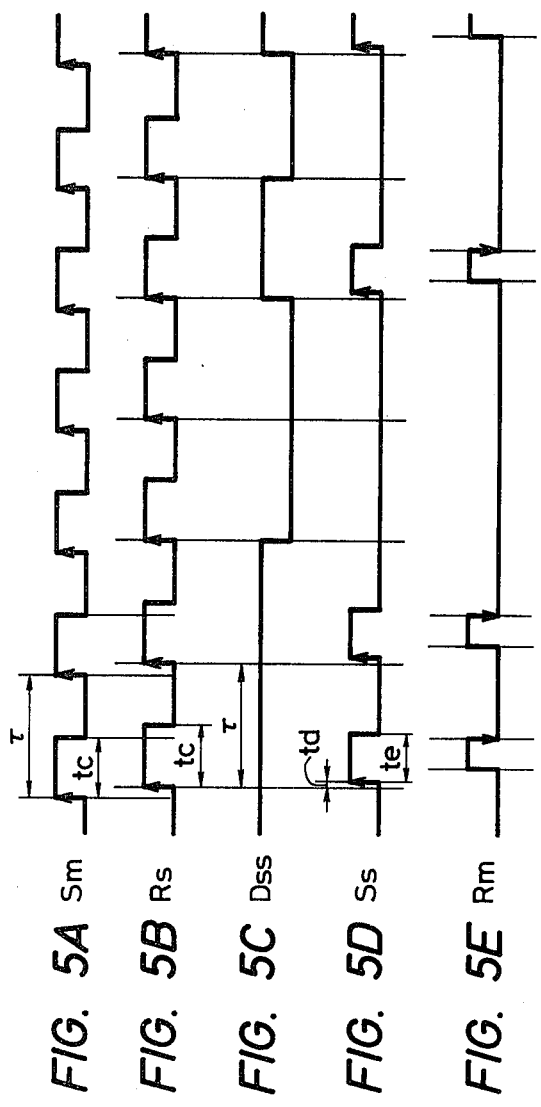

TWO-WAY TRANSMISSION SYSTEM

BACKGROUND OF THE INVENTION

The present invention relates to a two-way transmission system for transmitting signals in two directions.

In particular, the invention relates to an insulated type signal transmission circuit for transmitting signals through a transmission line and transformers.

In general, for digital transmission over wires, it is essential that the transmission be of high quality and furthermore it is required that economical use be made of the transmission line. A two-way transmission system using a single line may satisfy these requirements. A frequency division system and a time division system have been well known as techniques for preventing two-way signals from interfering with each other on a single line of a two-way transmission system. However, for the frequency division system, in order to improve transmission capability, it is necessary to correctly and accurately maintain the level difference of transmission signals and the frequency assignment with the result that bandpass filters must be provided which have tight tolerance requirements. Furthermore, since the transmitted signals must be within a predetermined frequency band, it is impossible to transmit baseband signals and it is necessary to employ a suitable modulation system which makes the necessary circuits complex and makes the manufacturing cost quite high.

On the other hand, the time division system has a low efficiency because each signal can be transmitted only in one direction at a time. Furthermore, in each transmission direction, the transmission side has sole control of the line and synchronization between receiving and transmitting sides is difficult. Thus, the time division system is not suitable for high speed transmission.

A double-line type time division two-way transmission system has been proposed in the art in which, as shown in FIG. 1, a master station converts an NRZ (nonreturn-to-zero) double-current signal into an RZ (return-to-zero) signal which is applied to the line L while at a sub-station the RZ signal is received to regenerate the NRZ signal. At the sub-station, a clock signal is extracted from the received RZ signal and subjected to phase shifting so that an NRZ signal from the sub-station is converted into an RZ signal in synchronization with the clock signal thus processed. The RZ signal is transmitted to the master station. Such a system is disclosed, for instance, in Japanese Published Patent Application No. 21963/1978.

More specifically, in FIG. 1, when a signal generator 20 in the master station generates an NRZ digital signal with a predetermined bit width, a signal transmitting and receiving circuit 21 converts the signal into an RZ signal into an RZ pulse with the aid of a clock signal from a clock circuit 22 with the RZ pulse being applied to the transmission line L. The RZ pulse from the sub-station is applied through the signal transmitting and receiving circuit 21 and a transmission suppressing circuit 23 to a recognition circuit 24. In the sub-station, the RZ pulse from the master station is received by a signal transmitting and receiving circuit 25 and is applied through a transmission suppressing circuit 27 to a recognition circuit 29 while it is simultaneously shaped by a pulse shaping circuit 30 and is then applied to a clock circuit 28. The clock circuit 28 generates a clock signal in response to the output of the pulse shaping circuit 30. The clock signal thus generated is applied to a signal generator 26 to control an NRZ digital signal provided by the signal generator 26.

In the system shown in FIG. 1, as the signal transmission of the sub-station is controlled by the clock signal which is provided according to the RZ signal from the master station, the two-way signals never interfere with each other on the transmission line. However, in the system of FIG. 1, it is necessary to convert NRZ signals into RZ double-current signals and to shift the phases of clock signals. Accordingly, it is difficult to simplify the circuitry and to manufacture the system at low cost.

Heretofore, in a signal transmission device as in a computer controlled process input and output system, as shown in FIG. 1, in order to insulate the signal transmitting side from the signal receiving side against differences in the base levels of transmitted and received signals, transformers 4 and 5 are disposed between a master side signal transmitting and receiving circuit 1 and a transmission line 3 and between a slave side signal transmitting and receiving circuit 2 and the transmission line 3.

Recently, it has been required to increase the speed of operation of data processing devices and there has accordingly been a strong demand that a signal transmission device be so improved that it can transmit signals at higher speeds and over longer distance than was previously considered practical.

It can be considered that, for a long transmission line, the circuit parameters, namely, resistance, inductance and capacitance are uniform along the line. Long transmission lines suffer from a problem that, because the cable capacitance is a distributed parameter, it is difficult to increase the rate of signal transmission. This adversely affects the transmission of signals at high rates over long distances.

In view of the foregoing, an object of the invention is to provide a two-way transmission system which provides high transmission quality, stable two-way transmission, excellent anti-noise characteristics, which is implemented with simple circuitry and which is low in manufacturing cost.

Yet further, an object of the invention is to provide an improved insulated type signal transmission system using transformers with a considerably simple circuit arrangement but in which decreases in the signal transmission rate caused by the distributed capacitance of the transmission cable is prevented making it possible to transmit signals at high rate over a long distance and in which a polymorphic arrangement can be provided between master stations and a slave station.

SUMMARY OF THE INVENTION

In accordance with this and other objects, the invention provides a two-way transmission system including a master station and a sub station. A pulse transformer in one or both of the signal transmitting and receiving circuits in the master station and the sub station is driven by first switching means to transmit a master station side transmission signal to the sub station through a single transmission line. The variations of current flowing in one of the two windings of a pulse transformers, which are caused by variations in impedance of the other winding, are detected to receive a sub station side transmission signal. In the sub-station, the master station side transmission signal is received and detected and a sub-station side transmission signal is applied to second switching means with timing signals which are in a predetermined relation with the master station side transmission signal to thereby change the impedance of the other winding of the pulse transformer.

Further, in accordance with the invention, there is provided an insulated type signal transmission system including pulse transformers and a transmission line for transmitting signals upon the transmission line by driving the pulse transformers in a DC mode. A rectifier element having a non-linear voltage vs current characteristic is inserted in series with the transmission line on the side of the transmission line of the pulse transformer on at least one of the signal transmitting side and signal receiving side.

Furthermore, according to another aspect of the invention, the signal transmitting side is provided with a plurality of signal transmitting circuits which are connected in parallel with the junction point between the pulse transformer and the rectifier elements on the signal receiving side as a connecting point.

BRIEF DESCRIPTION OF THE DRAWINGS

FIGS. 4A–4D and 5A–5E are timing diagrams showing various signals in a transmission mode and a reception mode of the system in FIG. 3;

DESCRIPTION OF THE PREFERRED EMBODIMENTS

Preferred embodiments of the invention will be described with reference to FIG. 3 through FIG. 8.

Figure 1:
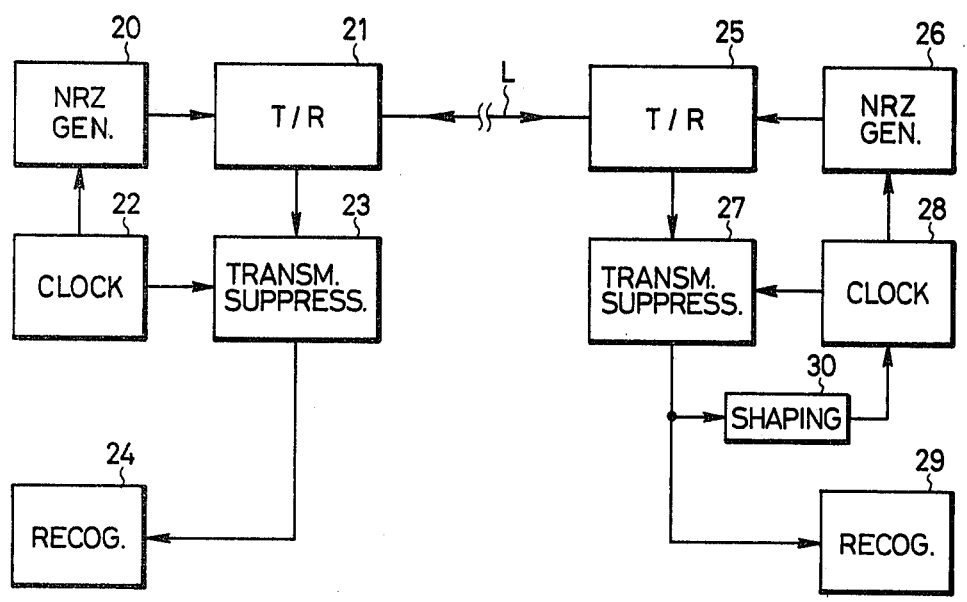
FIG. 1 is a block diagram showing a conventional time division type two-way transmission system.
Figure 2:
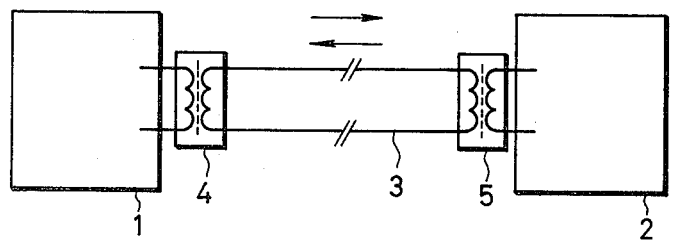
FIG. 2 is an explanatory diagram for an insulated type signal transmission system.
Figure 3:
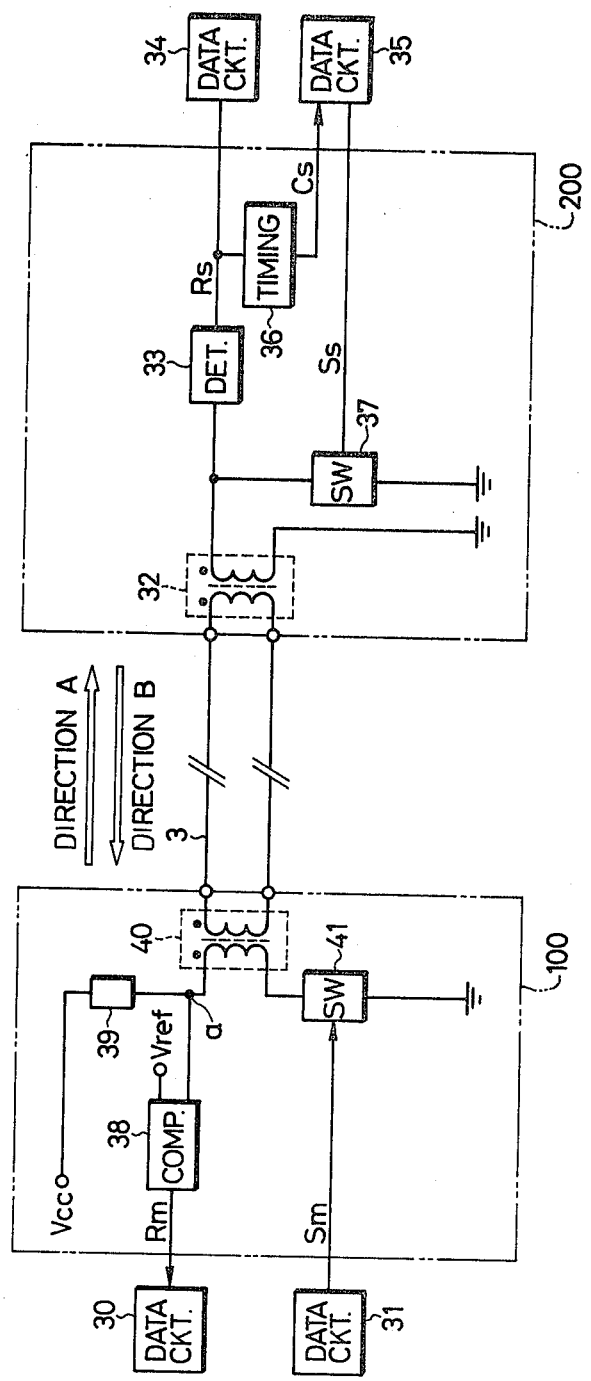
FIG. 3 is a block diagram showing a preferred embodiment of a two-way transmission system constructed according to the invention.

FIG. 3 is a block diagram showing a preferred embodiment of a two-way transmission system constructed according to the invention. As shown in FIG. 3, a master station side signal transmitting and receiving circuit 100 is connected to data circuits 30 and 31 while a sub station side signal transmitting and receiving circuit 200 is connected to data circuits 34 and 35. The circuits 100 and 200 are connected to each other through pulse transformers 40 and 32 and a single signal transmission line 3. In the two-way transmission system thus constructed, a synchronizing signal for signal transmission and reception is produced in the master station and is transmitted to the sub-station and the operations in the sub station are carried out upon receipt of and synchronized with the synchronization signal.

In the master station, a DC source Vcc is connected through a resistor 39 to the primary winding of the pulse transformer 40. A master station side transmission signal or a synchronizing signal Sm from the data circuit 31 operates a switching circuit 41 to drive the pulse transformer 40. One end of the resistor 39 connected to the primary winding of the pulse transformer 40 is connected to a comparator 38 which compares the voltage on that end of the resistor with a reference voltage Vref. The output of the comparator 38 is applied, as a master station side reception signal Rm, to the data circuit 30. The secondary winding of the pulse transformer 40 is connected through the transmission line 3 to the sub station side signal transmitting and receiving circuit 200.

In the sub station, the secondary winding of the pulse transformer 32 is connected to the transmission line 3. One end of the primary winding is grounded while the other end is connected to a reception signal detecting circuit 33 and a switching circuit 37. The output of the detecting circuit 33 is applied, as a sub station side reception signal Rs, to the data circuit 34. At the same time, the reception signal Rs is applied to a timing circuit 36 which outputs a sub station side control output signal Cs used to control the data circuit 35. Under the control of the control output signals Cs, the data circuit 35 produces a sub station side transmission signal Ss with suitable timing. The switching circuit 37, being connected to the data circuit 35, is switched by the sub station side transmission signal Ss.

Signal transmission in the direction A (from the master station to the sub station) will be referred to as "a transmission mode" and a signal transmission in the direction B (from the sub station to the master station) as "a reception mode".

FIGS. 4A–4D, taken together, are a timing diagram showing signals in the "transmission mode" in FIG. 3 and FIGS. 5A–5D, taken together, are a timing diagram showing signals in the "reception mode".

The master station side transmission signal Sm shown in FIG. 4A is a signal which is subjected to pulse width modulation in correspondence to master station side transmission data Dsm. The switching circuit 41 carries out its switching operation repeatedly with the signal Sm. The load of the switching circuit 41, namely, the pulse transformer 40, is driven by operation of the switching circuit 41 so that the master station transmission signal Sm is applied to the transmission line 3 to drive the sub station side pulse transformer 32. The driving of the pulse transformer 32 is detected by the reception signal detecting circuit 35 whereby the sub station side reception signal Rs is produced as indicated in FIG. 4C.

In this case, suitable constants, namely, the pulse widths ta and tb in one time slot, are set for correct transmission of the pulse width modulation waveform. To this effect, the sub station side reception signal Rs is formed by reproducing the pulse width modulation signal with high accuracy. Accordingly, in the sub station, the data circuit 34 can readily reproduce the master station side transmission data Dsm. In the transmission mode, the switching circuit 37 in the sub station is in the open state and therefore the sub station side transmission signal Ss is a "low" logic level.

In the reception mode, the master station side transmission signal Sm shown in FIG. 5A is transmitted as "a delivery synchronization signal in the reception mode" to the sub station and the sub station side reception signal Rs shown in FIG. 5B becomes a synchronizing signal for signal transmission from the sub station to the master station. Under the control of the timing setting circuit 36, the data circuit 35, in response to sub station side transmission data Dss shown in FIG. 5C, generates the sub station side transmission signal Ss with a pulse width te which is delayed by td from the rise of the synchronizing signal. The sub station side transmission signal Ss shown in FIG. 5D is applied to the switching circuit 37. In order for, in this operation, the master station side transmission signal Sm (the delivery synchronization signal) to be continuously received by the sub station even when the switching circuit 37 is operated, it is necessary to set the signal pulse width tc to a suitable value. In addition, it is necessary to set the delay time td and the pulse width te so that the pulse of the sub station side transmission signal Ss is in a predetermined timing relation with the pulse of the master station side transmission signal Sm.

Figure 6:
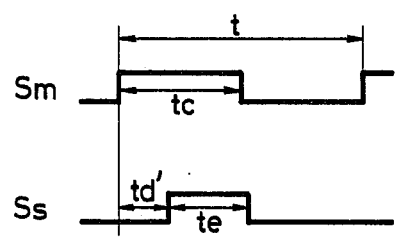
FIG. 6 is a timing diagram showing the time relationship between a master station side transmission signal and a sub station side transmission signal.
Figure 7:
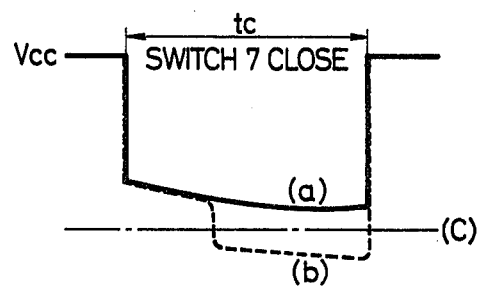
FIG. 7 is a diagram showing the waveform of a voltage developed in a pulse transformer in FIG. 2.

FIG. 6 is a timing diagram showing the timing relation between the master station side transmission signal Sm and the sub station side transmission signal Ss. FIG. 7 is a diagram showing the waveform of a voltage developed in the pulse transformer.

In FIG. 6, reference character td' designates the sum of the delay time td and the delay time caused by signal transmission. That is, in the pulse transformer 40 in the master station, the master station side transmission signal Sm and the sub station side transmission signal Ss are compared with each other as shown in FIG. 6. It is unnecessary to precisely set the delays tc, td and te as they need be set only approximately.

Let us consider the potential at one end (a) of the primary winding of the pulse transformer 40 in the master station. In the reception mode also, the switching circuit 41 is operated by the master station side transmission signal Sm shown in FIG. 5A. Therefore, when the master station side transmission signal Sm is at a "high" level, that is, when the switching circuit is closed, current flows from the DC source Vcc through the resistor 39 and the pulse transformer 40 as a result of which the potential at the point (a) has a waveform as shown in FIG. 7A or 7B because of the voltage drop across the resistor 39.

If, when the sub station side transmission signal Ss is at the low level when no pulse is present, the switching circuit 37 in the sub station is open, since the impedance Z of the secondary winding of the pulse transformer 40 in the master station is $Z_0$ (about 100 Ω), when the switching circuit 41 in the master station is closed, the voltage drop as indicated by the solid line (a) in FIG. 7 is present across the primary winding of the pulse transformer 40 and the following current flows therein:

$$I_0 + \frac{Vcc}{Z_0 + R39} \quad \text{(a)}$$

where R39 is the resistance of the resistor 39, $I_0$ is the exciting current, and the turn ratio of the pulse transformer is 1:1.

If, when the sub station side transmission signal Ss is at the high level and a pulse is present, the switching circuit 37 in the sub station is closed, the impedance of the secondary winding of the pulse transformer 40 becomes very low, $Z_1$ (almost 0 Ω). Therefore, when the switching circuit 41 in the master station is closed, a voltage drop as indicated by the broken line (b) in FIG. 7 is present across the primary winding of the pulse transformer 40 and the following current flows therein:

$$I_0 + \frac{Vcc}{Z_1 + R39} \quad \text{(b)}$$

Thus, in response to the sub station side transmission signal Ss, the current flowing in the primary winding of the pulse transformer 40 and accordingly the resistor 39 is changed as a result of which the potential at the point (a) changes in accordance with the current variation. The potential at the point (a) is compared with the reference voltage Vref by the comparator 38 and the output of the comparator 38 is employed as the master station side reception signal Rm. In this connection, the reference voltage Vref applied to the comparator 38 is set to a suitable value, such as a level indicated by (c) in FIG. 7, to detect the difference between the potentials (a) and (b) shown in FIG. 7.

As is apparent from the above description, in the "reception mode", during the period of one time slot τ, the synchronizing signal is transmitted from the master station to the sub station and the data signal is accordingly transmitted from the sub station to the master station.

Figure 8A:
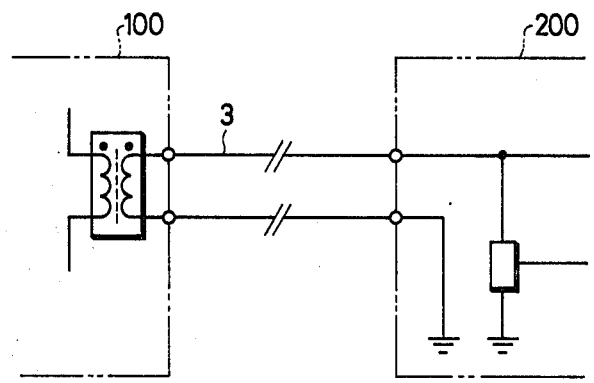
FIGS. 8a and 8b are circuit diagrams, partly as block diagrams, showing essential parts of another embodiment of a system according to the invention.

In accordance with the invention, the variations of the current flowing in the primary side of the pulse transformer due to the variations in impedance of the secondary side of the pulse transformer are detected. Therefore, it is unnecessary to provide pulse transformers for both the master station and the sub station. That is, the same effect for signal transmission can be obtained by providing a pulse transformer only in the master station as shown in FIG. 8A, that is, by omitting the pulse transformer in the sub station.

Figure 8B:
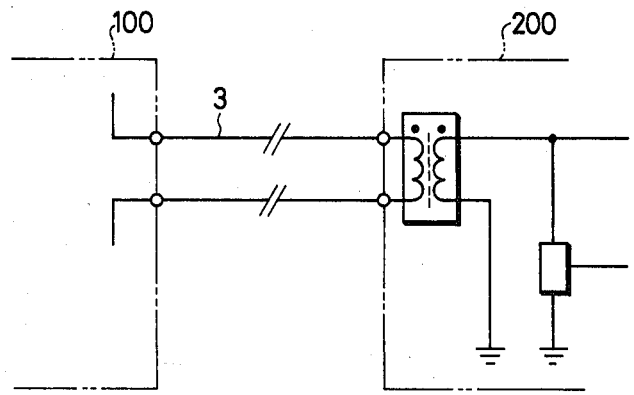

FIG. 8B, a pulse transformer is provided in the sub station only and the pulse transformer in the master station is eliminated. In this case also, the comparator is connected to the connection terminal of the transmission line 3 on the master station side so that the sub station side transmission signal can be reproduced with high accuracy by detecting the variations of the current flowing in the transmission line from the secondary winding of the pulse transformer in the sub station due to variations in impedance of the primary winding of the pulse transformer.

As described above, according to the invention, both the transmission circuits in the master station and the sub station are considerably simple in construction. Therefore, if the two-way transmission system of the invention is utilized with a process controlling signal input and output device having a number of input and output signal lines, then its manufacturing cost can be reduced while the overall system reliability is simultaneously remarkably improved. Furthermore, the system of the invention can perform two-way signal transmission with high efficiency because of the inherent nature of the circuitry employed and signal transmission can be achieved over a relatively long distance with high quality. In addition, the invention is advantageous in that the circuit constants required for determinating the various time periods necessary for signal transmission can be set only approximately and the circuit constants can be maintained unchanged even if the length of the transmission line is changed.

Moreover, as the impedance of the transmission circuit can be made low, the system of the invention has excellent anti-noise characteristics. If the pulse transformers are insulated, the system can be applied to signal transmission between two points having a base potential difference.

Figure 9:
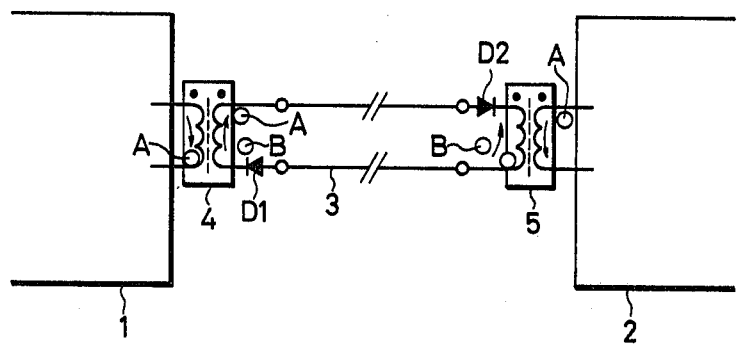
FIG. 9 is an explanatory diagram showing another embodiment of a signal transmission system according to the invention.

FIG. 9 shows another embodiment of a transmission system according to the invention. As shown in FIG. 9, diodes D1 and D2 are inserted in series with the transmission line 3 on the sides of the secondary windings of the pulse transformers 4 and 5. Therefore, when the state of the switching circuit shown in FIG. 9 is changed from "open" to "closed", current flows in the pulse transformers 4 and 5 and the transmission line 3 in the direction of the arrow A, that is, in the forward direction of the inserted diodes, and hence the signal transmission is not affected at all. On the other hand, at the instant when the switching circuit is opened, current tends to flow in the direction of the arrow B due to the transient voltage components L(di/dt) of the transformers. However, current flow is blocked by the diodes D1 and D2 and therefore the distributed capacitance of the cable is not charged by the current. In this case, some of the energy stored in the transformers charges equivalent capacitance components other than the distributed capacitance of the cable. However, almost all the energy is consumed by the switching circuit. If, in this connection, a switching element having a high voltage withstanding characteristic is provided for the switching circuit, then the effect of the transient voltages on the switching element can be substantially neglected. Accordingly, a problem in the case where the length of the transmission line is increased that the signal transmission speed is decreased by the effect of the transient signals which are caused when the transformers are switchably driven is not present in the system of the invention.

Figure 10:
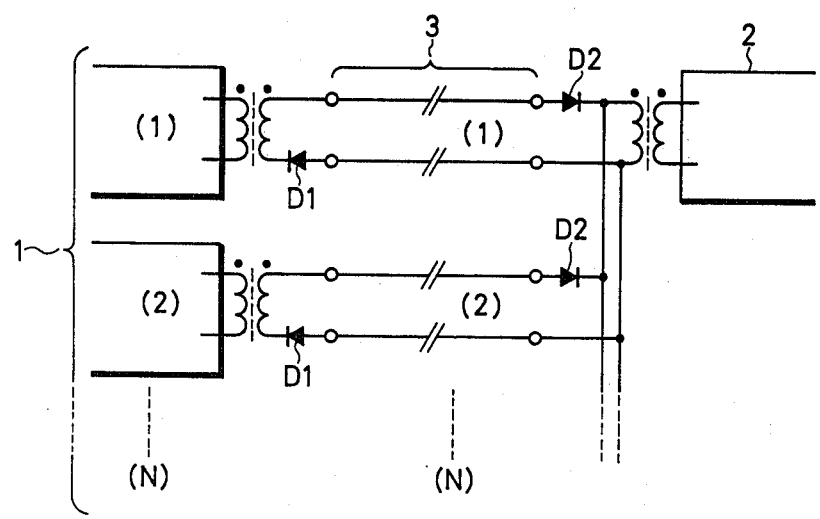
FIG. 10 is a diagram showing a polymorphic arrangement with the ratio of the number of master side transmission circuits to the number of slave side transmission circuits being N:1.

FIG. 10 shows a multi-route or polymorphic arrangement for master side transmission circuits and a slave side transmission circuit. More specifically, FIG. 10 shows a polymorphic arrangement with the ratio of the number of master side transmission circuits to the number of slave side transmission circuits being N:1. Diodes D2 are inserted in the transmission lines so that a master station can transmit to and receive signals from a slave station without affecting the remaining master stations nor being affected by the remaining master station. That is, even if a master station fails, its transmission function can be transferred to another master station. However, it should be noted that it is impossible for a plurality of master stations to operate simultaneously.

Figure 11:
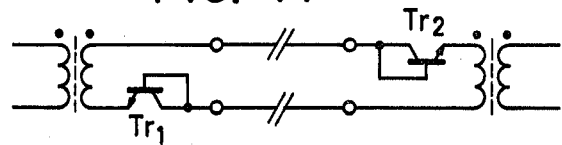
FIG. 11 is a circuit diagram showing yet another embodiment of a transmission system according to the invention in which transistors diode-connected are employed instead of diodes.
Figure 12:
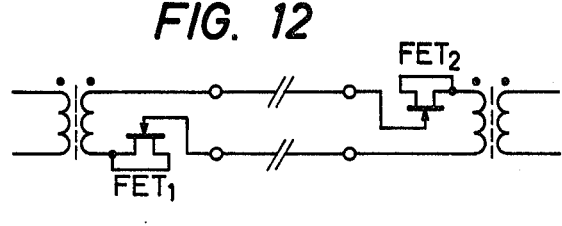
FIG. 12 is a circuit diagram showing still another embodiment of a transmission system according to the invention in which FET's diode-connected are employed.
Figure 13:
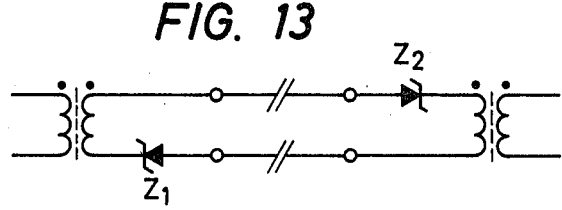
FIG. 13 is a circuit diagram showing another embodiment of a transmission system according to the invention in which zener diodes having a suitable zener voltage are employed.

FIGS. 11, 12 and 13 show modifications of the diodes D1 and D2 series-connected to the cable 3. In FIG. 11, diode-connected transistors $Tr_1$ and $Tr_2$ are employed. In FIG. 12, diode-connected field-effect transistors (FET's) are employed instead of the diodes D1 and D2. In FIG. 13, zener diodes Z1 and Z2 having a suitable zener voltage are employed.

Figure 14:
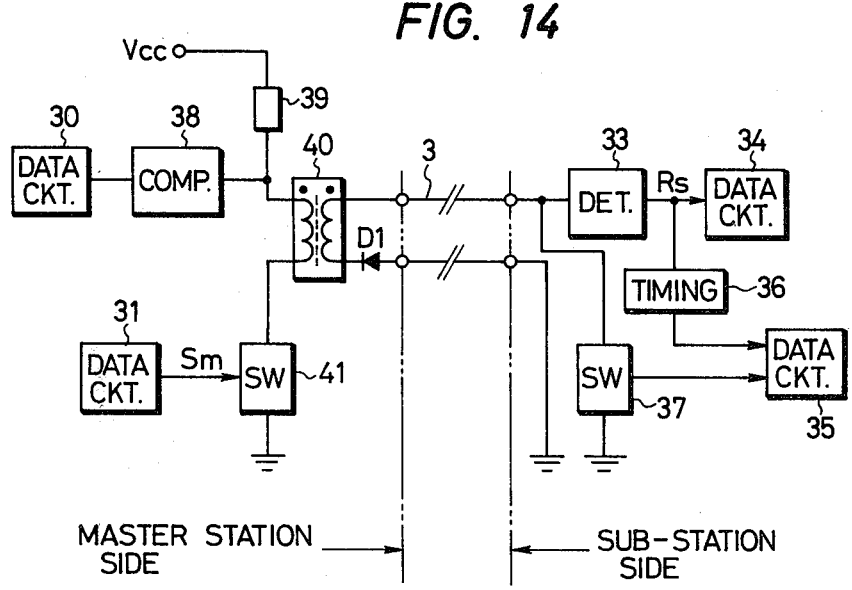
FIG. 14 is a circuit diagram showing a further embodiment of a transmission system according to the invention in which the pulse transformer and the diode on the slave side have been eliminated.

FIG. 14 shows yet another embodiment of a signal transmission circuit according to the invention in which the pulse transformer and the diode of the slave side are omitted.

That is, the circuit arrangement in FIG. 14 is formed by eliminating the pulse transformer 5 and the diode D2 from the circuit arrangement in FIG. 9. The circuit arrangement can still satisfactorily provide signal transmission. In this embodiment, the number of pulse transformers is reduced to one, the inserted diode is effectively utilized, and the transmission characteristic is improved.

As is clear from the above description, according to the invention, in an insulated type signal transmission system for transmitting signals through transmission line and transformers, diodes are inserted in series with the transmission line. Therefore, the transient response of the pulse signal which is caused by the distributed capacitance of the transmission line is decreased which prevents a decrease in the signal transmission rate and makes it possible to transmit signals at high rates over a long distance.

Furthermore, according to the invention, a polymorphic arrangement can be provided for transmission circuits and therefore the reliability of the transmission system can be improved by providing a plurality of transmission circuits on the transmission side.

The invention is applicable to the above-described insulated type signal transmission system using transformers. More generally, the invention is applicable to signal transmission circuits for processing input and output devices, production control terminals, POS terminals, centralized metering devices, equipment inspecting devices, etc.

What is claimed is:

1. A two-way transmission system for transmitting information over a single transmission line comprising: a master station and a sub station;
   said master station comprising a pulse transformer having a first winding connected to both a signal transmitting means and a signal receiving means and a second winding connected through a single transmission line to said sub station, first switch means for exciting said primary winding and transmitting a master station side transmission signal to said sub station through said single transmission line, and means for detecting variations of current flowing in said first winding of said pulse transformer caused by variations in an impedance connected across said second winding of said pulse transformer to detect a sub station side transmitted signal; and
   said sub station comprising receiving means for receiving and detecting said master station side transmission signal, second switching means, and transmitting means for applying a sub station side transmission signal to said second switching means as a function of a predetermined timing relation to said master station side transmission signal to change said impedance connected across said second winding of said pulse transformer.

2. The signal transmission circuit as claimed in claim 1, wherein said master station comprises a resistor coupled between a power source and a first terminal of said first winding of said pulse transformer, a switching circuit coupled between a second terminal of said first winding and a ground terminal of said power source with said switching circuit being coupled to operate in response to data supplied by a first data circuit means, and a comparator having a first comparison input terminal coupled to said first terminal of said first winding and a second comparison input terminal coupled to a reference signal source, an output of said comparator forming an output to a second data circuit means.

3. The transmission system of claim 2 further comprising a second pulse transformer for coupling said receiving end of said transmission line to said detecting means.

4. The transmission system of claim 3 wherein said signal generating means comprises means for delaying an output of said detecting means, means for producing a data signal in response to the delayed output from said detecting means, and switching means coupled to the same winding of said second pulse transformer as said detecting means, said switching means being coupled to operate in response to outputs of said data generating means.

5. An insulated type signal transmission system comprising: a transmission line, one pulse transformer coupled to said transmission line, a first diode means coupled in series with a second winding of said pulse transformer at a first terminal thereof and a second diode means coupled in series with said second winding at a second terminal thereof, and a plurality of signal transmitting circuits connected in parallel and coupled to said first terminal and said second terminal of said second winding of said pulse transformer.

6. The transmission system of claim 5, further comprising first diode means coupled in series with a first terminal of said second winding of said pulse transformer and second diode means coupled in series with a second terminal of said second winding of said pulse transformer.

* * * * *